United States Patent [19]

Fulmer et al.

[11] 4,381,332

[45] Apr. 26, 1983

[54] ADHESIVE AND RESULTING NONWOVEN FABRIC

[75] Inventors: Glenn E. Fulmer, Clarksville; Louis L. Wood, Rockville, both of Md.

[73] Assignee: W. R. Grace & Co., New York, N.Y.

[21] Appl. No.: 340,826

[22] Filed: Jan. 19, 1982

[51] Int. Cl.³ ........................................... C08G 18/32
[52] U.S. Cl. .................................. 428/288; 428/290; 428/360; 428/361; 428/423.1; 428/423.7; 528/52; 528/57; 528/59; 528/60; 528/76; 528/77
[58] Field of Search ............... 428/288, 290, 360, 361, 428/423.1, 423.7; 528/52, 57, 59, 60, 76, 77

[56] References Cited

U.S. PATENT DOCUMENTS

| | | | |
|---|---|---|---|
| 2,948,691 | 8/1960 | Windemuth et al. | 260/2.5 |
| 3,719,050 | 3/1973 | Asao et al. | 61/36 R |
| 4,118,354 | 10/1978 | Harada et al. | 260/29.2 TN |
| 4,246,146 | 1/1981 | Wood et al. | 260/9 |

*Primary Examiner*—Maurice J. Welsh
*Attorney, Agent, or Firm*—Edward J. Cabic; Richard P. Plunkett; William W. McDowell, Jr.

[57] ABSTRACT

A prepolymer having a molecular weight of at least 3,000 is made from a polyether polyol where all the OH groups are capped with an aliphatic polyisocyanate. When mixed with water the prepolymer reacts to form an elastomeric cross-linked polyurethane gel adhesive which can be used to adhere fibers to from a nonwoven fabric. Examples of the aliphatic diisocyanate are IPDI (isophorone diisocyanate) and hydrogenated MDI. A catalyst can also be applied to the aqueous mixture to accelerate the adhesive binder formation.

26 Claims, No Drawings

4,381,332

ADHESIVE AND RESULTING NONWOVEN FABRIC

BACKGROUND OF THE INVENTION

1. Field of the Invention

The present invention relates to an elastomeric polyurethane gel composition which is suitable for use as an adhesive for nonwoven fibrous materials and a process for making this composition. The invention also relates to nonwoven fabrics made with these gel-forming reactants.

2. Description of the Prior Art

Polyurethane gel production is known. The Windemuth et al. U.S. Pat. No. 2,948,691 discloses that isocyanate modified polyglycolethers, especially those having a molecular weight higher than 2,000, are soluble in water. These polymers are prepared by reacting polyglycolethers having at least two terminal hydroxyl groups with either mono- or polyfunctional aliphatic or aromatic isocyanates. Aqueous solutions prepared with these materials are not stable because of the high reactivity of the isocyanate group in water. Thickening or gel formation is said to occur with increasing molecular weight within an interval of some minutes depending on the solid content of the solution.

For example, a solution of 4 percent of an isocyanate modified polyglycolether prepared from a polyglycolether of the molecular weight of 4,030, which is obtained by the addition of ethylene oxide to trimethylolpropane, produces a gelatinous mass. In another example an isocyanate modified polyglycolether containing 3.2 percent of NCO groups, was obtained from a polyglycolether based on the addition of ethylene oxide to trimethylolpropane and toluene diisocyanate. Upon stirring the product into water it solidified into an insoluble gel with the evolution of carbon dioxide which was perceived by the formation of bubbles in the gel, especially when large quantities of isocyanate are used. Windemuth discloses this gel-forming reaction as being adapted to the thickening of aqueous solutions or emulsions. Windemuth's reaction products of the polyglycolether and the isocyanate are summarized as being used for producing plasticizers, lubricants, plastics, spongy materials, gel formers, thickening agents, auxiliaries in textile industry and the like, with no teaching or suggestion of use as a nonwoven fiber adhesives.

In the Asao et al. U.S. Pat. No. 3,719,050 a polyurethane prepolymer having terminal isocyanate groups is reacted with water in the soil to gel the polyurethane prepolymer and solidify the soil. The elastomer formed is said to have excellent strength and to strongly adhere to the soil to improve the soil properties.

The polyurethane prepolymer of Asao et al is synthesized from 2 to 8 moles of polyisocyanate per mole of a polyalkylene oxide compound. The alkylene oxides employed include ethylene oxide (EO), propylene oxide (PO), butylene oxide (BO), as well as styrene oxide and epichlorohydrin. In preferred embodiments the prepolymer is obtained as a reaction product of an ethylene oxide-propylene oxide copolymer having an ethylene oxide unit and propylene oxide unit in a ratio of from 90/10 to 70/30, which is reacted with an isocyanate compound having at least two isocyanate groups.

The polyurethane prepolymer is liquid or pasty at room temperature, and when added to 97 to 85 percent by weight of water, it readily dissolves, thereby forming a transparent solution, or is dispersed homogeneously therein to form an emulsion. The aqueous solution or emulsion is converted in a period of 20 seconds to two hours to a water-insoluble water-containing plastic material having a high elasticity. The polymerization of the urethane prepolymer by the cross-linking reaction with water produces carbon dioxide. Since the carbon dioxide gas produced is dissolved in the water present in the system, the resultant water-containing plastic material is a gel with a slight increase in volume owing to the gas formation.

The only utility of this polyurethane prepolymer is to form a gel when used as a soil-injecting agent. Inorganic materials such as clay, cement and the like can be mixed with the prepolymer and then injected into the soil. The elastomer which forms is said to have an extremely excellent strength and it markedly improves the soil in view of its strong adherence to the soil.

The Harada et al. Pat. No. 4,118,354 discloses a similar gel produced by dispersing a reaction product obtained by the reaction of a polyisocyanate having at least two isocyanate groups with a polyether. The polyether comprises a plurality of alkylene oxides, 50 to 90 percent by weight of which is ethylene oxide, added at random to a polyalcohol having at least two terminal hydroxyl groups. The alkylene oxides are added in an amount of an average molecular weight within the range of 1,000 to 4,000 per each hydroxyl terminal group of the polyalochol.

The disclosed utility of these gels is in disposing of various sludges of the bottom of rivers, seas, and sludges removed from organic and inorganic waste liquids and sewage. The polyurethane hydrogels are also employed in disposing of liquid wastes released from breweries, papermills, dye works, tanneries, slaughter houses, etc. Further, aqueous solutions containing noxious metals and radioactive substances are said to be effectively confined within the polyurethane hydrogel to prevent them from being scattered.

The Wood et al. U.S. Pat. No. 4,246,146 discloses a generic class of elastomeric polyurethane gel compositions which includes the preferred materials of this invention. However, these compositions are mixed with large quantities of fire retardant materials to form a coating which provides a barrier for fire retardant protection.

In each of the Windemuth et al., Asao et al., Harada et al. and Wood et al. patent references, there is no discussion of making their gel compositions with aliphatic isocyanates to obtain an adhesive for binding nonwoven fabrics.

OBJECTS OF THE INVENTION

It is an object of this invention to obtain an adhesive polyurethane coating composition that can be applied to nonwoven fabrics.

It is a further object to obtain an adhesive polyurethane gel composition that can be readily made by dissolving or dispersing a prepolymer in a large amount of water.

It is a further object to obtain an adhesive polyurethane gel composition which is made from a polyurethane prepolymer having terminal NCO groups and being hydrophilic and capable of dissolving completely or of being colloidally dispersed in water so as to form an emulsion or a colloidal suspension. For simplicity, all of these prepolymers discussed hereinafter will be referred to as water soluble or dispersible prepolymers.

It is another object to obtain a flexible binder for a nonwoven fabric which can be applied onto the fibers to give good adhesion, flexibility, and resilience, while having good hand and drape.

These and other objects of the invention will become apparent as the description of this invention proceeds.

SUMMARY OF THE INVENTION

A rubbery adhesive has been obtained in the form of a prepolymer that can be mixed with water at the time of use to form an adhesive composition. Since the prepolymer reacts relatively slowly with water, the mixture can be dipped or sprayed onto materials to be bound together before there is any reaction to gelation. This slow curing adhesive is very effective for bonding particulate material such as fibers used in making nonwoven fabrics. One preferred form of the prepolymer is a diisocyanate-capped copolymer of an ethylene oxide and polypropyleneoxide diol where the diisocyanate is a slowly reacting aliphatic diisocyanate such as isophorone diisocyanate.

As the aqueous mixture is applied to the fibers it slowly forms a gel of a homogeneous network of swollen, hydrophilic, cross-linked polyurea-polyurethane with the fibers dispersed throughout. Eventually the water evaporates leaving a product bound together with a cross-linked polyurea-polyurethane binder.

The water soluble or dispersible polyisocyanate prepolymer can be made from a polyether polyol which contains enough oxyethylene units to make the prepolymer water soluble. In order to permit cross-linking of the final polymer coating, one embodiment employs a polyol which has more than two hydroxyl groups. Each of these hydroxyl groups can be capped with an aliphatic diisocyanate such as isophorone diisocyanate to yield the water soluble or dispersible polyisocyanate prepolymer. In another embodiment, the cross-linked final polymer structure can be obtained by selecting a diol, rather than a polyol, as the basic unit of the prepolymer with the isocyanate capping being done with a polyisocyanate having greater than two NCO groups per average molecule.

The NCO groups on the prepolymer produced carbon dioxide when contacted with water. To insure that a gel is formed rather than a conventional polyurethane foam, the effective amount of NCO groups per prepolymer molecule must be low. This is done by utilizing relatively large polyol molecules between the terminal NCO groups. When the hydroxyl groups of a large polyol molecule are capped with the diisocyanate groups, for example, the number average molecular weight of the prepolymer obtained is about 3,000 or above. The prepolymer is employed in the range of 1 to about 50 parts per 100 parts of water. When higher concentrations are used, the dispersion becomes very viscous and the open time for the reaction to occur decreases. A more preferred range is from about 1-20 parts per 100 parts of water.

The reaction rate and strength of the resulting bonded fiber mat can be increased by adding a catalyst. The catalyst can be added to the batting prior to the addition of the prepolymer-water mixture, to the mixture just before or as it is being applied to the batting or the catalyst can be added to the prepolymer-water mixture coated batting. For example, an aqueous catalyst solution can be applied by spraying after the adhesive has been applied. Among the preferred catalysts are sodium carbonate, sodium bicarbonate, potassium hydroxide, ammonium hydroxide and calcium oxide as well as amine catalysts.

DETAILED DESCRIPTION OF THE PREFERRED EMBODIMENTS

The prepolymer used in making the gels has a relatively large molecular weight with a relatively low amount of NCO per unit weight. Foams, on the other hand, have a much larger concentration of NCO groups per weight of the prepolymer. For example, the foams described in the Murch et al. U.S. Pat. No. 4,066,578 have about two equivalents of NCO per 1000 grams of the prepolymer where one equivalent of NCO weighs 42 grams. This concentration can also be expressed as two milliequivalents of NCO per gram of prepolymer and written as 2 meq. NCO/g. The present gels have considerably less NCO groups on the order of about 1.0 meq. NCO/g or less. Thus there is a great deal more of the hydrophilic polymer between each terminal NCO group which by itself is hydrophobic. As a result the overall prepolymer is hydrophilic and dissolves completely or colloidally disperses in water.

One technique for making the low NCO concentration prepolymer is to chain extend a polyol with polyoxyalkylene units. Using the triol glycerol with the units of ethylene oxide and/or propylene oxide, for example, the following prepolymer forming polyol can be obtained

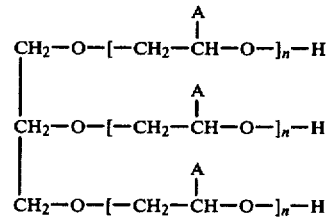

with the value of n being about 17 to 100 and where A can be H, $CH_3$, or $C_2H_5$. When A is H, the bracketed unit is an ethylene oxide (EO) unit, when A is $CH_3$, the unit is propylene oxide (PO) and when A is $C_2H_5$, the unit is butylene oxide (BO). The amount of propylene oxide (PO) and/or butylene oxide (BO) employed must be limited since the prepolymer will not have the necessary hydrophilicity of only PO and/or BO is used. In the case where just PO and EO are used, the amount of moles of PO to the total moles of PO+EO should be less than about 50 percent so the prepolymer will dissolve or colloidally disperse in water. Similarly, when BO is used with EO, the amount of BO to the total moles of BO+EO should be less than about 50 percent.

This particular trifunctional polyol is then reacted with a diisocyanate to provide the urethane linkage and the terminal isocyanate groups. When using IPDI as the isocyanate, the prepolymer has the following formula:

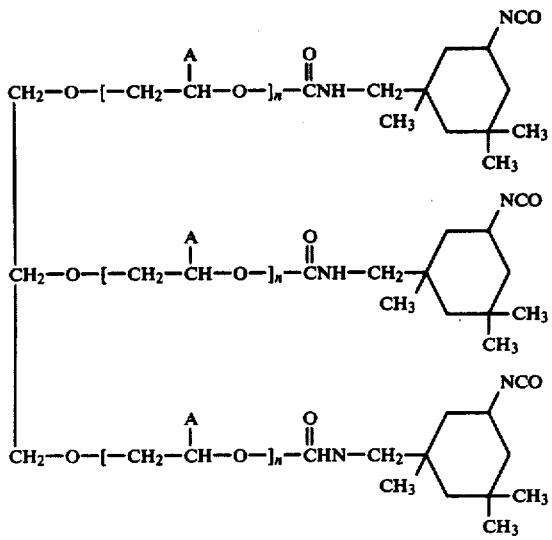

The selection of the polyoxyalkylene component depends on the conditions employed when the isocyanate capped prepolymer is subsequently dissolved in water to form the gel. A polyoxyalkylene polyol made of just ethylene oxide units will be hydrophilic and dissolve in water, but it is a solid at room temperature. This can cause a problem during gel formation. While waiting for the last of the solid prepolymer to slowly dissolve in water, the part that has already dissolved may prematurely begin to form the gel, as will be explained later, so that a homogeneous gel is not obtained. To avoid this problem, it is advantageous to have the prepolymer in a liquid form so it can readily dissolve without heating, which increases the gelation rate, and mix with the water to form the gel. A prepolymer which is a liquid at room temperature can be obtained by incorporating various amounts of a relatively hydrophobic comonomer into the ethylene oxide based polymerization product. Comonomers such as propylene oxide (PO) described in the example above or butylene oxide (BO) may be copolymerized as a random copolymer, a block copolymer, or both, such that the resulting copolymer remains hydrophilic. Random copolymerization is especially preferred to insure obtaining a liquid prepolymer having a low viscosity.

The addition of these comonomers also provides other desirable features for certain applications, namely improved low temperature flexibility, resiliency and the like. As discussed earlier, up to about 50 mole percent of a relatively hydrophobic comonomer such as propylene oxide may be copolymerized with the ethylene oxide monomer and still yield hydrophilic crosslinked network gels when those products are used as polyol intermediates in practicing the present invention. Preferred prepolymers have polyol moities containing only up to about 30 mole percent of the relatively hydrophobic comonomer. Thus, throughout this text the term "polyoxyethylene polyol" is intended to include not only a homopolymer of ethylene oxide, but also hydrophilic copolymers of ethylene oxide such as those described above wherein all of the polyol derivatives have a hydroxyl functionality of about two or greater and an ethylene oxide content greater than about 50, and preferably greater than about 70 mole percent.

The prepolymers do not have to be liquid. If the gel forming operation is carried out at an elevated temperature, then the prepolymer can be melted to the liquid state at that higher temperature. This liquid melt can then readily mix with the water to form the homogeneous gel. In addition, if the capping isocyanate is selected as one having a relatively low reactivity, then it may be acceptable to use a solid prepolymer and to wait for the solid to dissolve at room temperature because the gel forming reaction will not yet have begun.

Prepolymers can be made by reacting the diisocyanate or polyisocyanate with the reaction products of EO, PO or BO with simple polyols such as glycerol, 1,2,6-hexanetriol, 1,1,1-trimethylolpropane, ethylene glycol, diethylene glycol, propylene glycol, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5,1,1,1-tris[(2-hydroxyethoxy)methyl]ethane, 1,1,1-tris[(2-hydroxyethoxy)methyl]ethane, 1,1,1-tris-[(2-hydroxypropoxy)methyl]propane, triethanolamine, triisopropanolamine, pyrogallol and phloroglucinol.

One example of suitable commercially available chain-extended polyol is the polyether triol XD 1421 made by the Dow Chemical Company, which has a molecular weight of around 4900. It is composed of a ratio of three oxyethylene units randomly copolymerized per one unit of oxypropylene, and it has a hydroxy content of 0.61 meq. OH/g.

The chain extended polyol can then be capped with an aliphatic polyisocyanate. Suitable polyisocyanates useful in preparing this type of prepolymer include the triisocyanate Desmodur N-100 sold by Mobay which is a biuret adduct of hexamethylenediisocyanate; the diisocyanate Hylene W previously sold by DuPont and now available as Desmodur W from Mobay Chemical Corp. which is methylene bis(4-cyclohexyl isocyanate); the diisocyanate IPDI or isophorone diisocyanate sold by Thorson Chemical Corp., which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Another technique to produce the prepolymer is to use a polyfunctional isocyanate having a functionality greater than 2 in combination with a chain extended diol.

Suitable starting simple diols for chain extension useful in this method for preparing prepolymers include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, resorcinol, hydroquinone, 4,6-di-tertiarybutyl catechol, and catechol.

Other techniques to prepare the hydrophilic capped polyoxyethylene polyol reaction product having an average isocyanate functionality greater than two are disclosed in the Wood et al. U.S. Pat. No. 4,137,200, the disclosure of which is incorporated herein by reference.

As discussed above, particularly useful gels may be prepared by first capping a polyoxyethylene polyol with a polyisocyanate such that the capped product has a reaction functionality greater than 2. Thereafter, the resin is reacted by dissolving or emulsifying it in water such that ultimately a crosslinked gel results.

It is also possible to use an isocyanate capped polyoxyethylene polyol having a functionality approximating 2, in which case a polyfunctional reactive member such as one having three or up to about eight reactive amine, hydroxy, thiol or carboxylate sites per average molecule is included to form a three dimensional crosslinked product. The reactive member preferably is one that is reactive enough to compete with the reaction of the water with the isocyanate groups. Useful polyfunctional reactive members are amines which include materials such as diethylenetriamine, triethylenetetramine, tetraethylenepentamine, polyethyleneimine, tolylene-2,4,6-triamine, ethylenediamine, trimethylenediamine, tetramethylenediamine, pentamethylenediamine, hexamethylenediamine, diethanolamine, triethanolamine, and the like.

To produce the gel the prepolymer is dissolved or dispersed in water. Some of the terminal NCO groups react with water to form a carbamate compound which is unstable at room temperature and which breaks down to form an amine. The amine in turn reacts with another chain terminated NCO group to form a urea linkage to join the two chains. The reaction can be illustrated as follows:

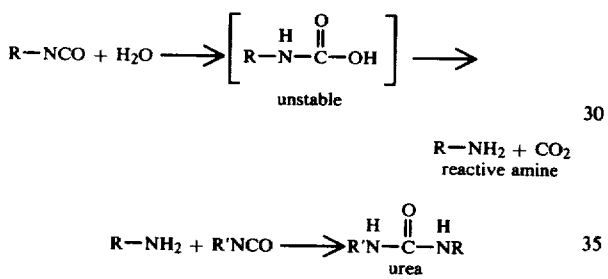

Suitable surfactants/suspending agents, often described as solution thickeners, include but are not limited to non-ionic cellulosic polymers such as hydroxyethyl cellulose polymers (e.g., Natrosol, such as Natrosol 250HH, by Hercules, or Cellosize by Union Carbide), hydroxypropyl cellulose (e.g., Klucel by Hercules), ethylhydroxyethyl cellulose (e.g., EHEC by Hercules), and ethyl cellulose. In addition to the above cellulosic polymers, other appropriate suspending agents include water-soluble polyoxyethylene polymers (e.g., Polyox by Union Carbide), gelatin, guar gum, agar, and polycarboxylic acids of high molecular weight (e.g. Carbopol 914 by B. F. Goodrich).

Surfactants may be added. Examples of suitable amphoteric and cationic surfactants are set forth in U.S. Pat. No. 4,066,578, which is incorporated by reference into the present application. Non-ionic surfactants include sorbitan trioleate (e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (Dow Corning 190), fluorochemical surfactants (e.g., Zonyl FSN by E. I. du Pont and Fluorad FC 170C by 3M), condensates of ethylene oxide and propylene oxide with propylene glycol (e.g., Pluronic L31, Pluronic L62, Pluronic L64, Pluronic P75 by BASF Wyandotte), and organosilicone surfactants (e.g., L520 by Union Carbide).

When the product is to be used where it will be subjected to ultraviolet light, then conventional UV stabilizers can be added such as Tinuvin 765 made by Ciba-Geigy Corp.; Hostavin VP ARO 8 made by American Hoechst Corp.; a combination of Tinuvin 765 and Irganox 1010 which is made by Ciba-Geigy Corp.; or a combination of Irganox 1010 and Tinuvin P made by Ciba-Geigy Corp.

Since the aliphatic isocyanate containing prepolymer does not react quickly to form a gel, it is possible to mix a warm prepolymer with water and to then spray the mixture onto materials that need to be bound together. In a preferred embodiment using isophrone diisocyanate as the diisocyanate component for the prepolymer, it is possible to have an open window time of about one hour or more before all of the prepolymer reacts with water to form a gel. This period permits the aqueous mixture to be made and applied to surfaces by spraying.

After the adhesive mixture has been applied to the fibers to form a bound fiber structure, the yield strength can be increased by applying a catalyst. One preferred method is to spray an aqueous catalyst solution onto the bound fiber structure. Among the preferred catalysts are sodium carbonate, triethylenetetramine, diethylenetriamine, sodium bicarbonate, potassium hydroxide, ammonium hydroxide, and calcium oxide. For industrial applications the two amines may not be as preferred as the other materials.

Other catalysts that have been found useful to strengthen the binder include Polycat 77 (made by Abbott Laboratories), a 50-50 mixture of sodium carbonate and sodium bicarbonate, triethyl amine, Thancat DD (made by Jefferson Chemical Co.) and urea.

TESTS USED IN EVALUATING THE BATTINGS

The following test procedures were utilized. All the samples were machine made and had most of the fibers oriented in one direction known as the machine direction. The samples to be tested were cut in the dry state to uniform size of a 1 inch wide strip and the strip was cut perpendicular to the machine direction of the sample. By cutting the strip which has the fibers in this orientation, the material being evaluated is being measured with respect to the weakest direction of the material.

A. Modulus

The modulus is a measure of the springingness or stiffness of the material and it is measured as the slope of the stress-strain curve at 1% elongation.

B. Yield Stress

The yield stress is obtained from the stress-strain curve. The curve initially increases in stress value until a point is reached at which the curve begins to turn in a decreasing downward direction. The stress value at this highest peak point is the yield stress.

C. Yield Strain

The yield strain is obtained from the stress-strain curve as the strain value of the curve at the point where the yield stress is measured.

D. Failure Stress

The failure stress is the stress at the last point on the stress-strain curve where the sample has failed and broken.

E. Failure Strain

The failure strain value is obtained from the last point on the stress-strain curve at the failure point where the failure stress has been measured.

F. Pounds/Inch Width

This test measures the maximum stress that the sample was able to take divided by the width of the sample in inches.

Having described the basic aspects of my invention, the following examples are given to illustrate specific embodiments thereof.

PREPARATION EXAMPLE 1

One thousand grams of the polyether triol XD1421 made by Dow Chemical Company and composed of a ratio of three oxyethylene units randomly copolymerized per one oxypropylene to a molecular weight of around 4900 and having 0.61 meq. OH/g. was reacted at 70° C. with 133.2 g. of isophorone diisocyanate sold by Thoroson Chemical Corp. having 1.20 meg. NCO until the NCO number reached 0.53 meq NCO/g.

PREPARATION EXAMPLE 2

The composition of Preparation Example 1 was made with 5 g. of dibutyltin dilaurate added as a catalyst. The reaction was continued until the reaction product had 0.76 meq NCO/g. The material was allowed to sit overnight so that the NCO level was 0.58 meq NCO/g. Viscosity at 25° C. was 19,600 cp.

PREPARATION EXAMPLE 3

In this example, a larger batch was made. Nineteen gallons of the polyol, Pluracol Polyol V-7 (made by BASF-Wyandotte Corp.), weighing 172.5 pounds was first treated with 17.3 pounds Amberlite IR 120 Resin (made by Rohm and Haas Co.) to remove the sodium and potassium impurities. The two materials were placed in a mixer and heated to about 158° F. under a nitrogen atmosphere and the mixture was left to mix overnight. The mixture was then centrifuged in a basket centrifuge to remove the ion exchange resin. The resulting 162.7 lbs. of purified Pluracol V-7 was charged to the reactor along with 30 grams of Santonox R, an oxidant made by Rohm and Haas Co. The temperature was maintained at 83° F. during mixing. The water obtained from contact with the ion exchange resin was distilled off by heating the mixture under a vacuum. The process began at a temperature of 135° F. at 40 Torr. and continued until a temperature of 160° F. at 6 Torr was obtained over a period of about 14 hours. Further heating was done with nitrogen passing through the material to obtain a water content of less than 0.10 weight percent.

To this dried Pluracol was added 18.9 pounds of isophrone diisocyanate made by Thoroson Chemical Corp. and the mixture was heated under nitrogen at a temperature of 158° F. for about 48 hours. Since the NCO content did not decrease rapidly, 50 grams of T-9 catalyst (stannous octoate produced by Jefferson Chemical Co.) were added while the Pluracol was at 75° F. An exothermic reaction caused a temperature increase to 122° F. in 30 minutes. The contents of the reactor were then further heated to about 165° F. for the remainder of the 4 hour period. The addition of the catalyst brought the NCO content down from 0.9 meq./g. to 0.57 meq./g. The product obtained weight 166.7 pounds.

PREPARATION EXAMPLE 4

In this example a large batch was made following a procedure similar to Preparation Example 3.

The same amount of 17 gallons of Pluracol V-7 weighing 172.5 pounds was deionized by adding 26 pounds of Amberlite IR 120 ion exchange resin. The Pluracol V-7 was deionized at 158° F. for 24 hours. The resin was then removed from the Pluracol V-7 by centrifugation. From the filtered Pluracol, 167.6 pounds were recharged to the reactor along with 30.5 grams of Santonox R, which acts as a stabilizer. The mixture was heated to 158° F. and water was removed by applying vacuum and then bubbling nitrogen into the liquid. The water content was reduced from 4.5 weight percent to 0.09 weight percent.

A 19.6 pound quantity of isophorone diisocyanate was added to the reactor and the mixture was agitated for 15 minutes. Then a portion of the mixture was placed in a small container where it was heated to 70° C. for 96 hours. The NCO content dropped from 0.96 to 0.51 meq./g.

PREPARATION EXAMPLE 5

In this example a prepolymer was made with methylene bis(4-cyclohexylisocyanate) as the aliphatic isocyanate. This is a hydrogenated MDI.

In a reactor a mixture of 450 g. of Pluracol V-7 and 0.2 g. of Santonox R was degassed for 2 hours at 70° C. Then 61.7 g. of Desmodur W, a methylene bis(4-cyclohexylisocyanate), made by Mobay Chemical Corp. was added and the mixture was heated to 70° C. for 20 hours. Then 1 drop of T-9 catalyst (stannous octoate) was added and the mixture was heated for another 12 hours at 70° C. The final product had an NCO content of 0.63 meq./g.

EXAMPLES 1-5

These examples show the improved properties that can be obtained by spraying a batting manufactured by the Star Textile and Research Co. which was a Kodel type polyester fiber which had been commercially sprayed on both sides with a phenolic type binder.

In Example 1 a control is used which is a sample that has been commercially sprayed on both sides with the phenolic binder with no further binder added. It is estimated this material contains 16–18 weight percent of a conventional resin. The modulus and tensile properties for this control are given in Table 1B below.

A spraying solution was made by mixing 2 grams of the prepolymer of Preparation Example 2 with 100 grams of water. This solution was then sprayed on each side for the spraying times listed in Table 1A by using a ⅛ J spray nozzle made by Spraying Systems Co. The liquid pressure was about 40 psi and the air pressure was 14-16 psig for the air. Penetration of the batting was good. In Table 1A the weight before spraying is given as well as the weight after the spraying and drying. The percent add on is calculated and also listed in this Table.

TABLE 1A

IPDI HYDROGEL SPRAYED ON KODEL POLYESTER BATTING

| Example | Prepolymer | Spraying Time (sec) | Sides No. | Batting Weight Before | Batting Weight After | % Add On |
|---|---|---|---|---|---|---|
| 1 (control) | — | — | — | — | — | 16–18 resin (est.) |
| 2 | 2 | 50 | 2 | 8.8 | 10.9 | 23.8 |
| 3 | 2 | 75 | 2 | 8.8 | 11.4 | 29.5 |
| 4 | 2 | 100 | 2 | 8.5 | 12.7 | 49.4 |
| 5 | 2 | 125 | 2 | 9.0 | 13.9 | 54.4 |

These sprayed materials were also evaluated for modulus and tensile strength with the results given in Table 1B. The modulus values are significantly increased from the control value of 0.98 up to values of 24–34. The yield stress values are increased from two to three times the yield stress value of the control while there was not much of a substantial change in the yield strain.

TABLE 1B

IPDI HYDROGEL SPRAYED ON KODEL POLYESTER BATTING
Tensile (1" Wide Samples)

| Ex. No. | Modulus | Y Stress | Y Strain | F Stress | F Strain | Lbs/ In Width |
|---|---|---|---|---|---|---|
| (control) | | | | | | |
| 1 | 0.98 | 0.59 | 129 | 0.17 | 225 | 0.352 |
| 2 | 27.9 | 1.15 | 87.4 | 0.24 | 152 | 0.528 |
| 3 | 34.2 | 1.85 | 91.0 | 0.39 | 153 | 0.472 |
| 4 | 24.7 | 1.67 | 104 | 0.27 | 185 | 0.488 |
| 5 | 31.0 | 1.68 | 96.0 | 0.20 | 176 | 0.272 |

EXAMPLES 6–10

These examples illustrate the increase in modulus and tensile properties obtained by spraying the present binder to a batting of unbonded Kodel polyester type fibers.

Example 6 serves as a control involving an uncoated batting of Kodel type polyester fibers. The tensile properties are given in Table 2B. In Examples 7–10 the present adhesive binder of Preparation Example 2 is applied to both sides of the batting. The binder solution was made by mixing 10 grams of the prepolymer with 100 grams of water and spraying each side of the material for the spraying times set forth in Table 2A.

TABLE 2A

IPDI HYDROGEL SPRAYED ON KODEL POLYESTER BATTING

| Example | Prepolymer | Spraying Time (sec) | Sides No. | Batting Weight Before | Batting Weight After | % Add On |
|---|---|---|---|---|---|---|
| 6 (control) | — | — | — | — | — | 0 |
| 7 | 10 | 10 | 2 | 7.7 | 10.6 | 37.6 |
| 8 | 10 | 15 | 2 | 7.7 | 11.2 | 45.4 |
| 9 | 10 | 20 | 2 | 7.7 | 13.0 | 68.8 |
| 10 | 10 | 25 | 2 | 7.7 | 13.5 | 75.3 |

In each of these four examples the samples were tacky when removed from a 70° C. oven and they remained tacky after air drying. It is assumed the materials were probably sprayed after the hydrogel had gelled. However, even with this non optimum application, the tensile data given in Table 2B and especially the yield stress data shows a significant improvement in properties over the properties of the control in Example 6.

TABLE 2B

IPDI HYDROGEL SPRAYED ON KODEL POLYESTER BATTING
Tensile (1" Wide Samples)

| Ex. No. | Modulus | Y Stress | Y Strain | F Stress | F Strain | Lbs/ In Width |
|---|---|---|---|---|---|---|
| (control) | | | | | | |
| 6 | 1.51 | 0.03 | 107 | 0.00 | 199 | 0.015 |
| 7 | 13.67 | 0.49 | 54.0 | 0.10 | 126 | 0.026 |
| 8 | 2.79 | 0.07 | 83.2 | 0.04 | 167 | 0.026 |
| 9 | 2.39 | 0.16 | 92.8 | 0.04 | 175 | 0.087 |
| 10 | 3.20 | 0.09 | 111 | 0.04 | 205 | 0.039 |

EXAMPLES 11–18

These examples illustrate the increase in modulus and tensile properties obtained by spraying the present binder to unbound Kodel type polyester fibers where only one side of the batting has been sprayed with the binder solution.

The same spraying procedure used in Examples 7–10 was followed with the spraying conditions for these Examples 11–18 set forth in Table 3A along with the amount of binder added on and calculated in the last column. The control from Example 6 is again set forth. In Examples 11–14 the spray mixture had 10 grams of prepolymer per 100 grams of water whereas a less concentrated solution having only 2 grams of prepolymer per 100 grams of water was used in Examples 15–18.

TABLE 3A

IPDI HYDROGEL SPRAYED ON KODEL POLYESTER BATTING

| Example | Prepolymer | Spraying Time (sec) | Sides No. | Batting Weight Before | Batting Weight After | % Add On |
|---|---|---|---|---|---|---|
| 6 (control) | — | — | — | — | — | 0 |
| 11 | 10 | 10 | 1 | 7.7 | 8.5 | 10.4 |
| 12 | 10 | 15 | 1 | 7.7 | 9.5 | 23.3 |
| 13 | 10 | 20 | 1 | 7.7 | 10.2 | 32.5 |
| 14 | 10 | 25 | 1 | 7.7 | 11.1 | 44.2 |
| 15 | 2 | 50 | 1 | 7.7 | 9.7 | 25.9 |
| 16 | 2 | 75 | 1 | 7.7 | 10.6 | 37.6 |
| 17 | 2 | 100 | 1 | 7.7 | 10.2 | 32.5 |
| 18 | 2 | 125 | 1 | 7.7 | 10.9 | 41.6 |

The modulus and tensile results are given in Table 3B. There are substantial increases from the control modulus of 1.51 to modulus values from 23 to 93. Similarly, the yield stress increases from a control value of 0.03 to higher values which range from 1.02 all the way up to 2.93, while the decrease in yield strain does not significantly harm the material.

TABLE 3B

IPDI HYDROGEL SPRAYED ON KODEL POLYESTER BATTING
Tensile (1" Wide Samples)

| Ex. No. | Modulus | Y Stress | Y Strain | F Stress | F Strain | Lbs/ In Width |
|---|---|---|---|---|---|---|
| (control) | | | | | | |
| 6 | 1.51 | 0.03 | 107 | 0.00 | 199 | 0.015 |
| 11 | 23.47 | 1.02 | 60.9 | 0.07 | 134 | 0.464 |
| 12 | 41.96 | 1.51 | 63.3 | 0.19 | 128 | 0.616 |
| 13 | 57.1 | 2.45 | 63.9 | 0.18 | 125 | 0.904 |
| 14 | 71.7 | 2.93 | 70.0 | 0.33 | 125 | 0.906 |
| 15 | 58.7 | 1.83 | 57.1 | 0.21 | 120 | 0.544 |
| 16 | 93.7 | 2.82 | 59.7 | 0.29 | 125 | 0.687 |

TABLE 3B-continued
IPDI HYDROGEL SPRAYED ON
KODEL POLYESTER BATTING
Tensile (1" Wide Samples)

| Ex. No. | Modulus | Y Stress | Y Strain | F Stress | F Strain | Lbs/ In Width |
|---|---|---|---|---|---|---|
| 17 | 34.58 | 1.54 | 69.9 | 0.20 | 142 | 0.451 |
| 18 | 35.42 | 1.18 | 51.9 | 0.14 | 104 | 0.363 |

EXAMPLES 19–22

These examples illustrate the hydrolytic stability of the hydrogel binder when used with nonwoven polyester batting.

In this test the IPDI-based prepolymer of Preparation Example 4 was mixed with water to form an aqueous dispersion having a 5% prepolymer concentration and this dispersion was sprayed onto nonwoven polyester battings and then dried at 140° C. for 3.5 minutes. Example 19 was a coated batting without any catalyst added and Example 21 was one in which a 1% $Na_2CO_3$ aqueous solution was sprayed on for one second after the hydrogel formulation had been applied. In Examples 20 and 22, similar coated products were subjected to a two week exposure at 40° C. and at 90% relative humidity. The results are set forth in Table 4.

TABLE 4A
IPDI HYDROGEL ON KODEL POLYESTER BATTING: HYDROLYTIC STABILITY

| Ex. No. | $Na_2CO_3$ Catalyst Spraying Time (sec) | Batting Weight Before Spray | % Add On | Hydrolytic Stability Exposure (Weeks) |
|---|---|---|---|---|
| 19 | 0 | 1.71 | 13.5 | 0 |
| 20 | 0 | 1.36 | 16.1 | 2 |
| 21 | 1 | 1.69 | 16.0 | 0 |
| 22 | 1 | 1.59 | 12.6 | 2 |

TABLE 4B
IPDI HYDROGEL ON KODEL POLYESTER BATTING: HYDROLYTIC STABILITY
Tensile (1" Wide Samples)

| Ex. No. | Modulus | Y Stress | Y Strain | Failure Stress | Failure Strain |
|---|---|---|---|---|---|
| 19 | 0.595 | 0.228 | 63.6 | 0.145 | 98.0 |
| 20 | 0.128 | 0.063 | 69.3 | 0.041 | 104.0 |
| 21 | 2.210 | 0.881 | 63.6 | 0.305 | 125.0 |
| 22 | 1.060 | 0.422 | 58.2 | 0.248 | 98.6 |

Although the average failure stress is less after the two week exposure, the individual values contain data scatter which do not reveal any statistically significant indication of hydrolytic degradation. The low value for the yield stress in Example 20 is apparently because the sample did not cure to a good strength during the 3.5 minute cure at 140° C.

EXAMPLES 23–24

These examples illustrate the effect of adding a catalyst to the hydrogel coating.

In both examples a 10% IPDI hydrogel solution made from the hydrogel prepolymer of Preparation Example 3 was applied to both sides of an unbonded polyester batting. Example 23 is the control while in Example 24 there was a post spray on each side for 1 second of a 1% solution of sodium carbonate which acts as a catalyst. In both examples the coated materials were then dried for 6 minutes at 140° C. in a flow-through dryer. The yield tensile stress for the two samples is given below.

TABLE 5

| Example | $Na_2CO_3$ Catalyst | % Add On of Binder | Yield Stress (psi) |
|---|---|---|---|
| 23 | No | 24.1 | 0.123 |
| 24 | Yes | 30.4 | 13.70 |

The substantial increase in yield strength illustrates the advantage of the addition of the catalyst.

EXAMPLE 25

This example illustrates the use of a prepolymer made from methylene bis(4-cyclohexylisocyanate) as the aliphatic diisocyanate which is a hydrogenated MDI.

The prepolymer of Preparation Example 5 was mixed with water to form an emulsion having a 10 weight percent hydrogel. The emulsion was sprayed for 8 seconds on both sides of the Kodel type polyester fiber batting described in Example 1 which had an initial weight of 1.97 g. After both sides were coated with the hydrogel, they were post sprayed on each side for 1 second with a 1% solution of sodium carbonate which acts as a catalyst. The sample was dried for 3.5 minutes at 140° C. The physical properties are set forth below in Table 6 along with the uncoated control of Example 6.

TABLE 6
HYDROGENATED MDI HYDROGEL SPRAYED ON KODEL POLYESTER BATTING
Tensile (1" Wide Samples)

| Ex. No. | Modulus | Y Stress | Y Strain | F Stress | F Strain |
|---|---|---|---|---|---|
| (control) 6 | 1.51 | 0.03 | 107 | 0.00 | 199 |
| 25 | 14.8 | 4.12 | 38.7 | 0.58 | 109.0 |

The increase in yield stress illustrates the significant improvement in properties over the control.

It is understood that the foregoing detailed description is given merely by way of illustration and that many variations may be made therein without departing from the spirit of this invention.

What is claimed is:

1. A method of adhering fibers to form a nonwoven fabric comprising applying to the fibers an elastomeric cross-linked polyurethane gel composition which is formed by reacting together water and a water soluble or dispersible prepolymer having a number average molecular weight of about at least 3,000 of a polyether polyol having essentially all of the OH groups capped with an aliphatic polyisocyanate.

2. A method according to claim 1, wherein the prepolymer is added in an amount of 1 to 50 parts by weight per 100 parts of water.

3. A method according to claim 1, wherein the aliphatic isocyanate is isophorone diisocyanate.

4. A method according to claim 1, wherein the aliphatic isocyanate is methylene bis(4 cyclohexyl isocyanate).

5. A method according to claim 1, wherein a catalyst is further added to assist forming the elastomeric cross-linked polyurethane gel composition.

6. A method according to claim 5, wherein the catalyst is added after the elastomeric polyurethane gel composition has been applied to the fibers.

7. A method according to claim 5, wherein the catalyst is selected from the group consisting of sodium carbonate, triethylenetetramine, diethylenetriamine, sodium bicarbonate, potassium hydroxide, ammonium hydroxide and calcium oxide.

8. A method according to claim 7, wherein the catalyst is selected from the group consisting of sodium carbonate, sodium bicarbonate, potassium hydroxide, ammonium hydroxide and calcium oxide.

9. A method according to claim 8, wherein the catalyst is sodium carbonate or sodium bicarbonate.

10. A method according to claim 1, wherein the fibers are polyester fibers.

11. A method according to claim 3, wherein a catalyst selected from the group consisting of sodium carbonate, sodium bicarbonate, potassium hydroxide, ammonium hydroxide and calcium oxide is further added to the elastomeric polyurethane gel composition.

12. A nonwoven fabric made by the method of claim 1.

13. A nonwoven fabric made by the method of claim 11.

14. A nonwoven fabric in which the fibers are bound together with an elastomeric cross-linked polyurethane gel composition which is formed by reacting together water and a water soluble or dispersible prepolymer having a number average molecular weight of about at least 3,000 of a polyether polyol having essentially all of the OH groups capped with an aliphatic polyisocyanate.

15. A nonwoven fabric according to claim 14, wherein the prepolymer is added in an amount of 1 to 50 parts by weight per 100 parts of water.

16. A nonwoven fabric according to claim 14, wherein the aliphatic isocyanate is isophorone diisocyanate.

17. A nonwoven fabric according to claim 14, wherein the aliphatic isocyanate is methylene bis(4 cyclohexyl isocyanate).

18. A nonwoven fabric according to claim 14, wherein a catalyst is further added to assist forming the elastomeric cross-linked polyurethane gel composition.

19. A nonwoven fabric according to claim 18, wherein the catalyst is added after the elastomeric polyurethane gel composition has been applied to the fibers.

20. A nonwoven fabric according to claim 18, wherein the catalyst is selected from the group consisting of sodium carbonate, triethylenetetramine, diethylenetriamine, sodium bicarbonate, potassium hydroxide, ammonium hydroxide and calcium oxide.

21. A nonwoven fabric according to claim 20, wherein the catalyst is selected from the group consisting of sodium carbonate, sodium bicarbonate, potassium hydroxide, ammonium hydroxide and calcium oxide.

22. A nonwoven fabric according to claim 21, wherein the catalyst is sodium carbonate or sodium bicarbonate.

23. A nonwoven fabric according to claim 14, wherein the fibers are polyester fibers.

24. The method according to claim 1 wherein the prepolymer is a liquid at room temperature.

25. The method according to claim 1 wherein the polyether polyol is made of random ethylene oxide units and other alkylene oxide units with the ethylene oxide units comprising at least about 50 percent of the total number of ethylene oxide and alkylene oxide units.

26. The method according to claim 25 wherein the ethylene oxide units comprise at least about 70 percent of the total number of ethylene oxide and alkylene oxide units.

* * * * *